US012215851B2

(12) United States Patent
Bourne et al.

(10) Patent No.: US 12,215,851 B2
(45) Date of Patent: Feb. 4, 2025

(54) PORTABLE LIGHTING DEVICE WITH INTEGRATED STORAGE

(71) Applicant: Energizer Brands, LLC, St. Louis, MO (US)

(72) Inventors: Chris Bourne, Painesville, OH (US); Alexa Valore, Cleveland, OH (US); Ruth Sholtis-Furyes, Lakewood, OH (US)

(73) Assignee: ENERGIZER BRANDS, LLC, St. Louis, MO (US)

( * ) Notice: Subject to any disclaimer, the term of this patent is extended or adjusted under 35 U.S.C. 154(b) by 0 days.

(21) Appl. No.: 18/057,094

(22) Filed: Nov. 18, 2022

(65) Prior Publication Data

US 2024/0167676 A1 May 23, 2024

(51) Int. Cl.

| | |
|---|---|
| ***F21V 33/00*** | (2006.01) |
| ***F21L 4/02*** | (2006.01) |
| ***F21L 4/08*** | (2006.01) |
| ***F21V 21/40*** | (2006.01) |
| ***F21Y 103/20*** | (2016.01) |
| ***F21Y 115/10*** | (2016.01) |

(52) U.S. Cl.

CPC ............ *F21V 33/0084* (2013.01); *F21L 4/02* (2013.01); *F21L 4/08* (2013.01); *F21V 21/406* (2013.01); *F21Y 2103/20* (2016.08); *F21Y 2115/10* (2016.08)

(58) Field of Classification Search

CPC .. F21V 33/0084; F21V 33/008; F21V 21/406; F21L 4/02; A45C 15/06; A45C 2200/10; B65D 51/248; A47G 2019/2238; A47G 19/2205; B25H 3/02; F25D 27/00

See application file for complete search history.

(56) References Cited

U.S. PATENT DOCUMENTS

| | | | | |
|---|---|---|---|---|
| 8,152,326 B2 * | 4/2012 | House | B65D 3/22 362/382 |
| D857,267 S | 8/2019 | Sherry et al. | |
| 10,752,403 B1 | 8/2020 | Rinear et al. | |

(Continued)

FOREIGN PATENT DOCUMENTS

| | | |
|---|---|---|
| CN | 208107715 U | 11/2018 |
| KR | 2016-0103733 A | 9/2016 |
| KR | 2019-0060086 A | 6/2019 |

OTHER PUBLICATIONS

Amazon. "WAGAN #Camplites Rechargeable USB LED Lantern Flashlight 3 Lighting Options High/Low/SOS For Camping, Hiking, Emergencies, Power Outage," (10 pages), [Retrieved from the Internet Oct. 2, 2023] <URL: https://www.amazon.com/4302-Camplites-Rechargeable-Flashlight-Emergencies/dp/B01K8ZDCI8/ref=asc_df_B01K8ZDCI8/?tag-hyprod-20&linkCode=df0&hvadid=194838933099&hvpos=&hvnetw=g&hvrand=1527778777687020539&hvpone-&hvptwo=&hvqmt-&hvdev-c&hvdvcmdl=&hvlocint=&hvlocphy=9060223&hvtargid=pla-310613577802&th=1>.

(Continued)

*Primary Examiner* — William N Harris
(74) *Attorney, Agent, or Firm* — Alston & Bird LLP

(57) ABSTRACT

A lighting device defining an interior storage space accessible by removing a lid from the main body portion of the lighting device. The main body portion is embodied as a first light emitting component and the lid is embodied as a second light emitting component. Each of the first light emitting component and the second light emitting component are configured for emitting a light output. The lighting device additionally includes a tray that may fit within the interior storage space of the lighting device.

18 Claims, 13 Drawing Sheets

(56) References Cited

U.S. PATENT DOCUMENTS

| | | | | |
|---|---|---|---|---|
| D961,827 | S | 8/2022 | Chen | |
| 2011/0058361 | A1 | 3/2011 | Houghton | |
| 2012/0002404 | A1* | 1/2012 | Ma | F21V 33/0024 362/154 |
| 2015/0292729 | A1* | 10/2015 | Sutton | F21V 33/0024 362/101 |
| 2018/0327154 | A1* | 11/2018 | Solan | B65D 51/18 |
| 2019/0003700 | A1 | 1/2019 | Brown | |
| 2020/0340632 | A1 | 10/2020 | Longarzo et al. | |
| 2021/0388956 | A1 | 12/2021 | Wu et al. | |
| 2022/0214035 | A1* | 7/2022 | Brown | F21V 33/0036 |

OTHER PUBLICATIONS

ISA/220—Notification of Transmittal or Search Report and Written Opinion of the ISA, or the Declaration Mailed on Feb. 13, 2024 for WO Application No. PCT/US23/079656, 106 page(s).

* cited by examiner

PORTABLE LIGHTING DEVICE WITH INTEGRATED STORAGE

BACKGROUND

Portable lighting devices, including flashlights, lanterns, and other lighting devices, continue to evolve in their functionality. As these devices are used for a variety of narrow use-cases, new features that are refined specifically for those use cases are always needed. For those lighting devices that are used in emergency lighting scenarios (e.g., power outages, during off-grid camping expeditions, and/or the like), a need constantly exists for devices that are usable for a variety of purposes, so that fewer single-function devices are needed by the user. Thus, a need constantly exists for lighting devices having additional functionality.

BRIEF SUMMARY

Various embodiments are directed to a lighting device (e.g., lantern, and/or the like) that incorporates one or more storage areas that may be used to store various items and may be closed (e.g., via a lid) to enclose the various items therein. The one or more storage areas may be housed within an illumination portion of the lighting device comprising one or more light sources. The light sources may be powered by an onboard power source and the lighting device may have an onboard controller for determining which onboard power source should be utilized when the lighting device is powered on. The lighting device may have one or more electrical connections for detachably connecting one or more separate electrical devices, such that the lighting device is usable as an auxiliary power source for connected devices, such as to recharge batteries onboard those separate devices. The lighting device may additionally have a second light emitting component that may be integrated into a lid of the lighting device and used independently.

Certain embodiments are directed to a lighting device comprising: a first light emitting component comprising: a housing having an open first end and one or more sidewalls surrounding the open first end, wherein at least a portion of the one or more sidewalls defines a light-transmissive portion; one or more first light sources disposed within the housing to emit light through the light-transmissive portion; a second light emitting component comprising: a body defining a first end and a second end, wherein the body is configured to fit within the open first end of the housing to position the first end of the body within the housing and wherein at least a portion of the first end defines a light emitting portion; and one or more second light sources disposed within the body to emit light through the light emitting portion.

In certain embodiments, the housing and the body have the same shape.

In certain embodiments, when the body is inserted into the housing, the second end of the body is parallel with an edge surrounding the open first end of the housing.

In certain embodiments, the light-transmissive portion is defined within a portion of the one or more sidewalls as including: (i) a light-transmissive side defining an outer side of the one or more sidewalls and (ii) an opposite, opaque side defining an inner sidewall of the one or more sidewalls.

In certain embodiments, the one or more sidewalls defines at least one light-passthrough, extending at least through the opaque side to enable light from the one or more second light sources to be visible through at least a portion of the one or more sidewalls.

In certain embodiments, the housing has a hollow interior.

In certain embodiments, the hollow interior defines a storage space.

In certain embodiments, lighting device further comprises a tray that fits within the storage space.

In certain embodiments, the housing further comprises a first power source.

In certain embodiments, the housing further comprises a charging channel configured for transmitting electrical current from the first power source to a separate electrical device.

In certain embodiments, the first power source comprises one or more onboard batteries.

In certain embodiments, the body further comprises a second power source.

In certain embodiments, each of the body and the housing further comprise electrical contacts such that the second power source can be charged from the housing.

In certain embodiments, the one or more first light sources comprises one or more light emitting diodes.

In certain embodiments, the one or more second light sources comprises one or more light emitting diodes.

In certain embodiments, the lighting device defines a cube shape.

In certain embodiments, the body further comprises a handle and hook member coupled to the handle configured for being coupled to a support structure.

In certain embodiments, the handle comprises a recessed portion, wherein the recessed portion is configured for receiving the hook member when in a collapsed orientation.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1A:
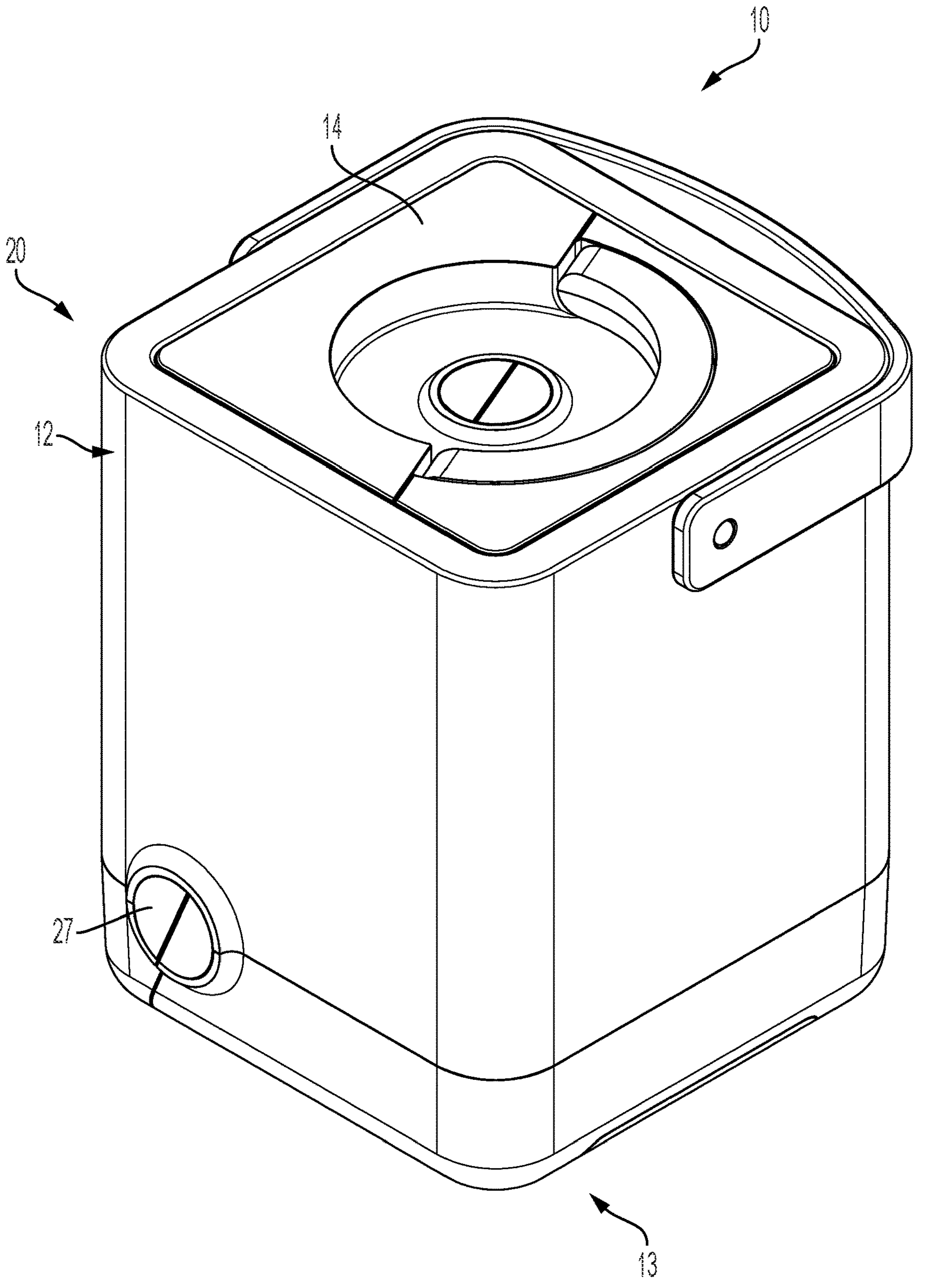
FIG. 1A shows an example lighting device according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

A lighting device as discussed herein incorporates one or more storage areas that may be closed (e.g., via a lid) to enclose various items therein. The light emitted by the lighting device is not impeded by items stored within the storage area. The storage compartments of certain embodiments define a plurality of divided storage areas that may each store various items therein. These divided storage areas may be separated from one another, such that items stored within a first divided storage area cannot contact items stored within a second divided storage area. In certain embodiments, at least one storage area is a removable tray that may fit within an interior storage compartment of the lighting device. The tray may be supported above a bottom surface of the interior of the storage compartment of the lighting device by standoffs integrated into the interior walls of the storage compartment, to define a second storage area between the bottom surface of the interior of the storage compartment and the bottom surface of the tray. Certain embodiments may comprise more than one storage tray. In certain embodiments, the one or more storage areas may omit the removable storage tray, such that the one or more storage areas is embodied as a single storage space.

The lighting device additionally comprises one or more light sources (e.g., Light Emitting Diodes (LEDs)). The one or more light sources may be positioned within the lighting device such that light emitted from the one or more light sources surrounds the storage area. In certain embodiments, the one or more light sources may be positioned under the storage area (e.g., within a base of the device), such that light emitted from the one or more light sources surrounds the storage area. In various embodiments, one or more light pipes, such as those discussed in U.S. Pat. No. 8,317,366, which is incorporated herein by reference, may be utilized to guide light from the light source to the sidewalls of the device. In certain embodiments, the one or more light sources may surround a perimeter of the storage area and may be housed within an illumination portion of the lighting device. The illumination portion may be a translucent (or transparent) material for diffusing light produced by the light sources. Those light sources are powered by an onboard power source, which may comprise at least one of: onboard rechargeable electrochemical cells and/or a compartment for housing replaceable electrochemical cells (e.g., primary alkaline, lithium, or other electrochemical cell types) such that those replaceable cells may be used as an onboard power source of the device. In certain embodiments, the lighting device additionally comprises an onboard controller for determining which onboard power source should be utilized when the lighting device is powered on.

In certain embodiments, the lighting device may additionally comprise one or more electrical connections for detachably connecting one or more separate electrical devices. Accordingly, the lighting device may be usable as an auxiliary power source for connected devices, such as to recharge batteries onboard those separate devices. In certain embodiments, the onboard controller may be configured to optimize charging of connected devices while simultaneously providing light via the onboard light sources when a separate device is connected. For example, the lighting device may be configured to limit the maximum brightness permitted while charging to a level below the overall maximum brightness of the lighting device.

In certain embodiments, the lighting device additionally comprises a second light emitting component that may be integrated into a lid of the device. The second light emitting component may be physically separable from the first light emitting component, and may be used independently of the first light emitting component. The second light emitting component may thus have an onboard power supply (e.g., a rechargeable battery, or a compartment for housing replaceable (e.g., primary) batteries for powering the device. It should be understood, however, that in certain embodiments, the lid of the device may not include a light emitting component.

Multi-Purpose Lighting Device

Figure 1B:
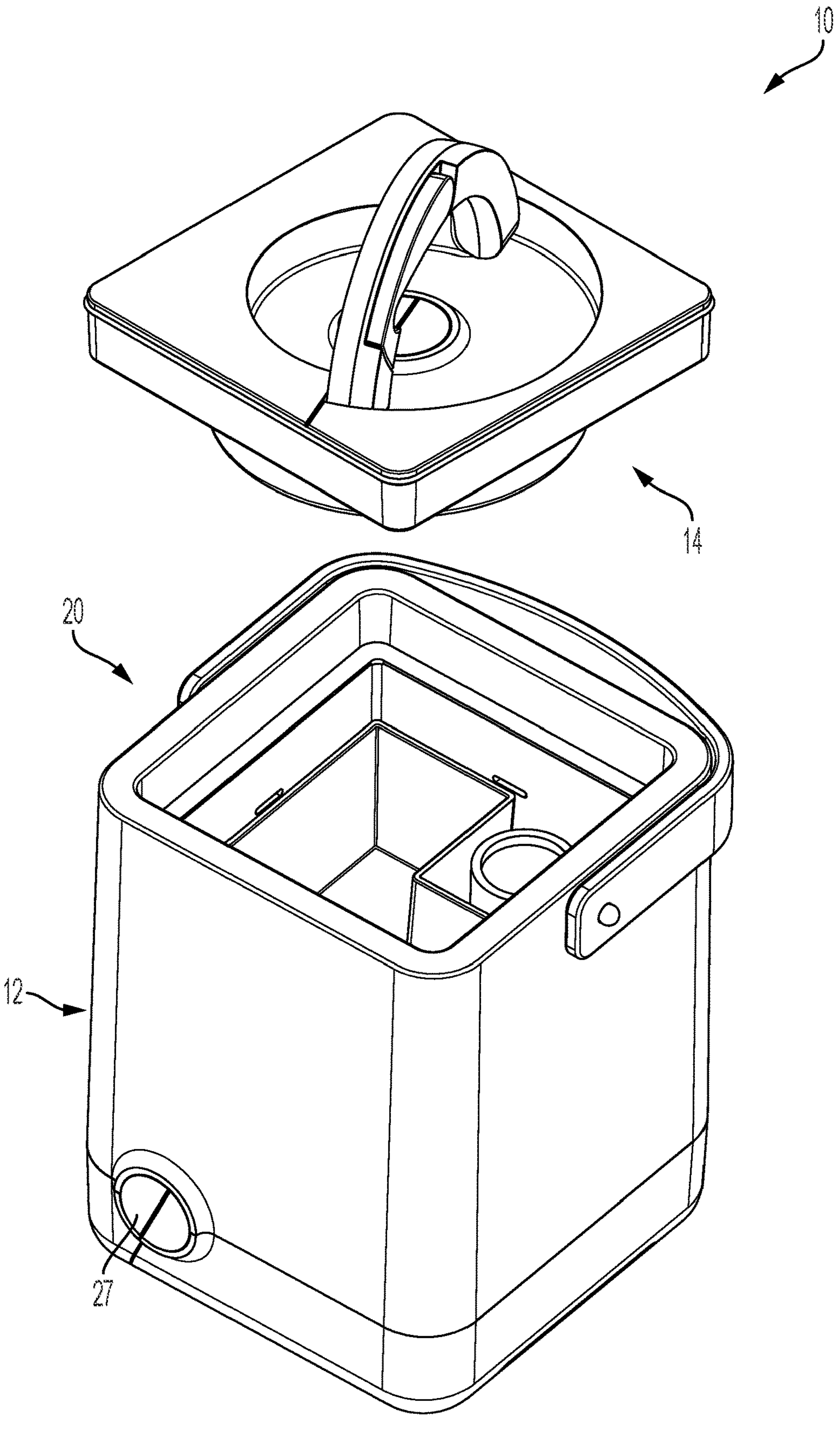
FIG. 1B shows the example lighting device with the first light emitting component separated from the second light emitting component.

An example lighting device 10 is shown in FIGS. 1A-1B. As shown therein, the lighting device 10 may be embodied as a lantern having a generally cube-shape. As shown, the lighting device 10 has a generally square cross-sectional shape (defined by the length and width of the device) and has a height that is taller than the length or the width. It should be understood that other dimensions and/or shapes may be provided. For example, a cylindrical body may be provided in certain embodiments. Other shapes, such as trapezoidal, octagonal, and/or the like may be provided while maintaining the functionality discussed herein.

Figure 6A:
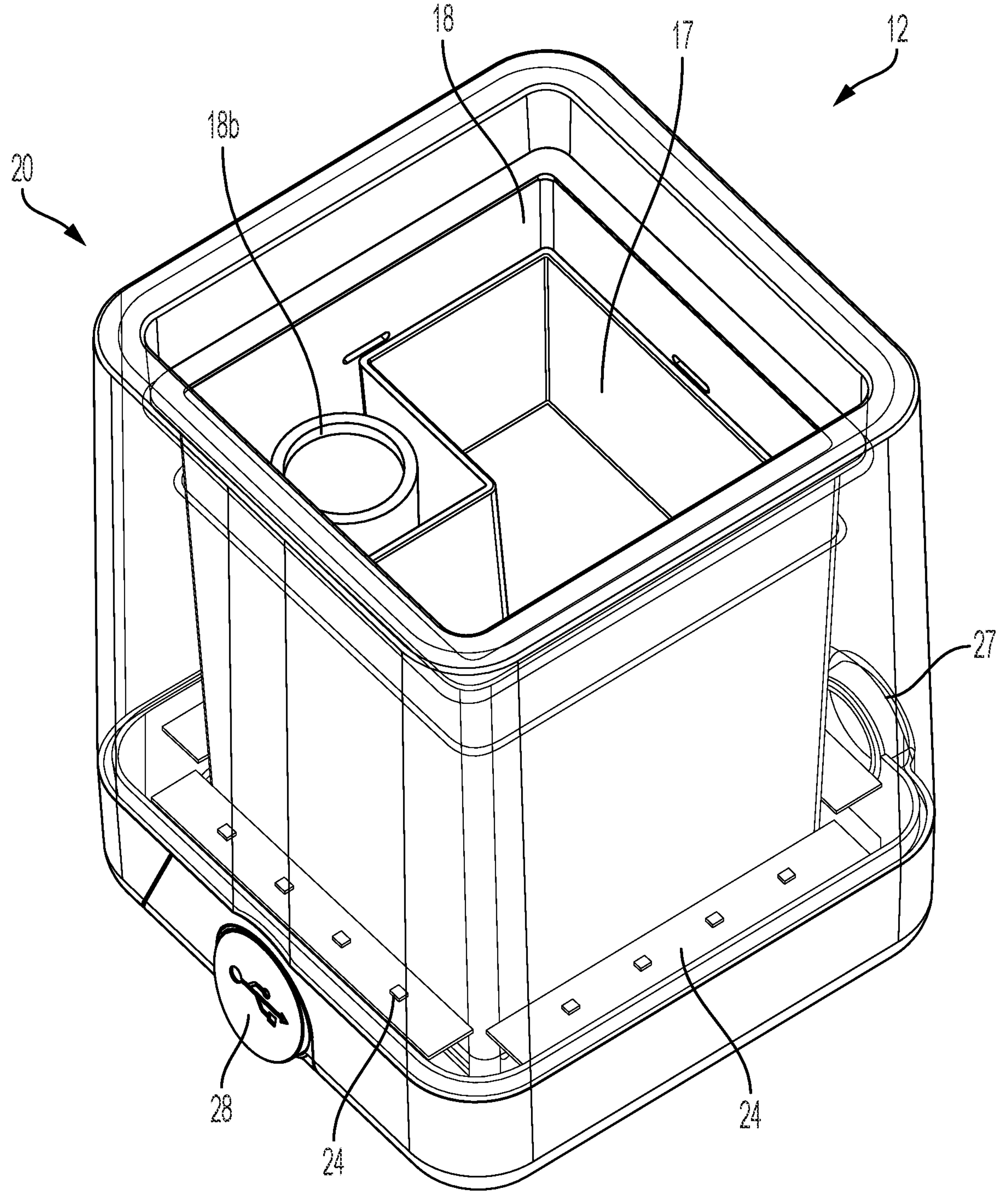
FIGS. 6A-6B show other views of an interior of an example first light emitting component.
Figure 6B:
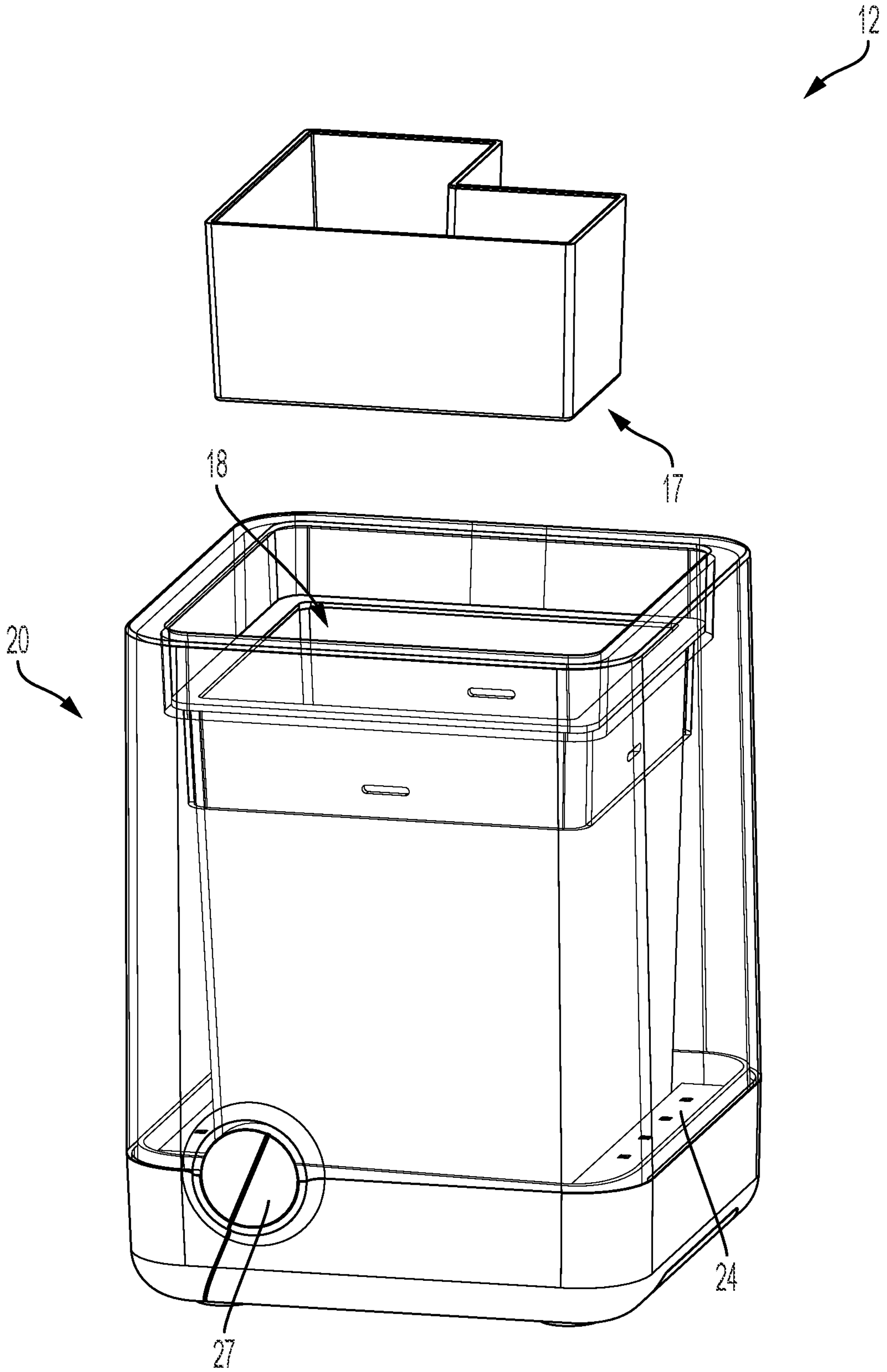

The lighting device 10 defines an interior storage space accessible by removing a lid from the main body portion of the lighting device 10. In the illustrated embodiment of FIGS. 1A-1B, the main body portion is embodied as a first light emitting component 12 and the lid is embodied as a second light emitting component 14 configured for being removably coupled to the first light emitting component 12, as shown in FIG. 1B. Each of the first light emitting component 12 and the second light emitting component 14 are configured for emitting a light output. In the embodiment of FIG. 6B, discussed in greater detail herein, the lighting device 10 additionally includes a tray 17 that may fit within the interior storage space of the lighting device.

First Light Emitting Component

Figure 2:
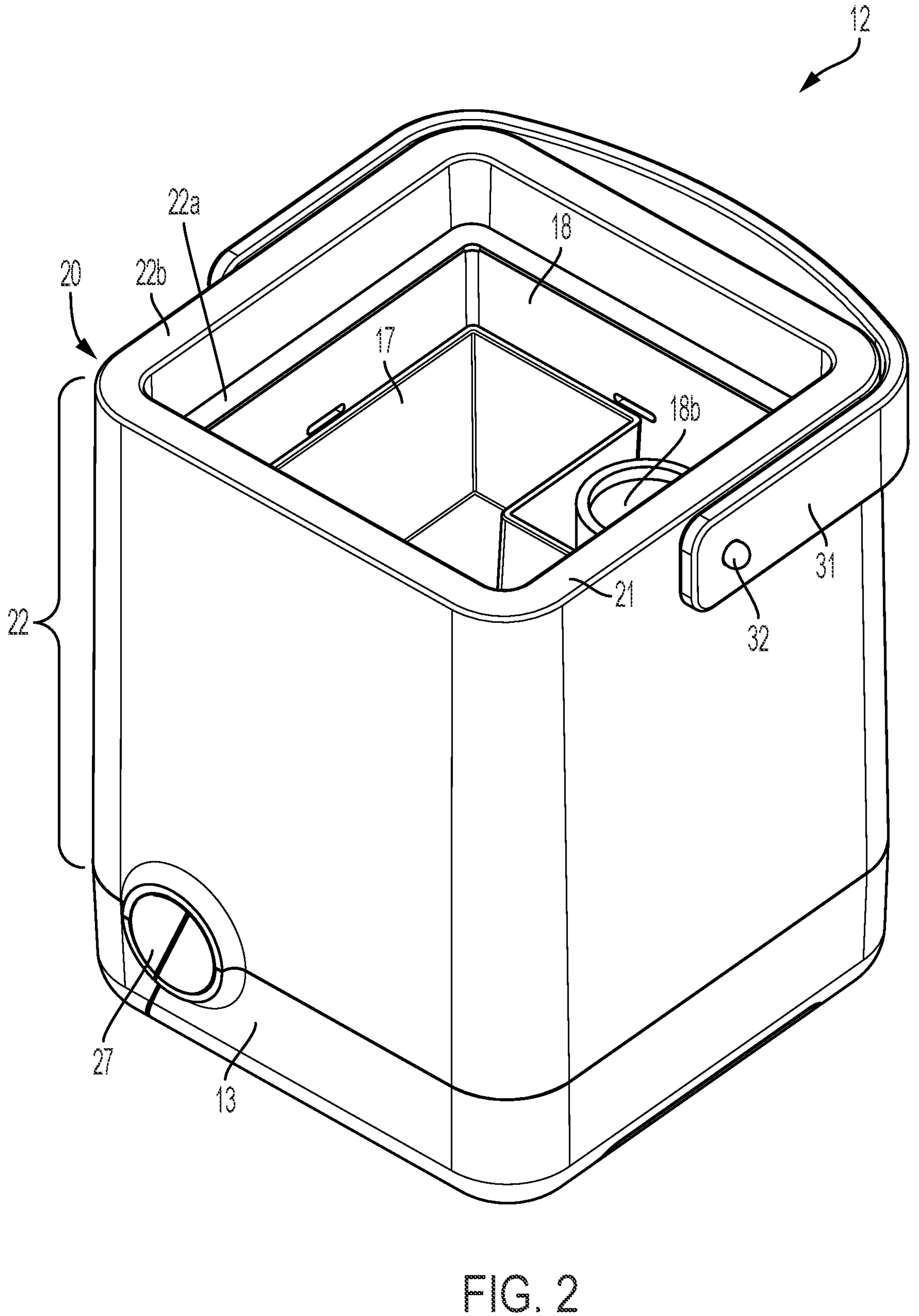
FIGS. 2-3 shows an example first light emitting component of an example lighting device according to one embodiment.
Figure 3:
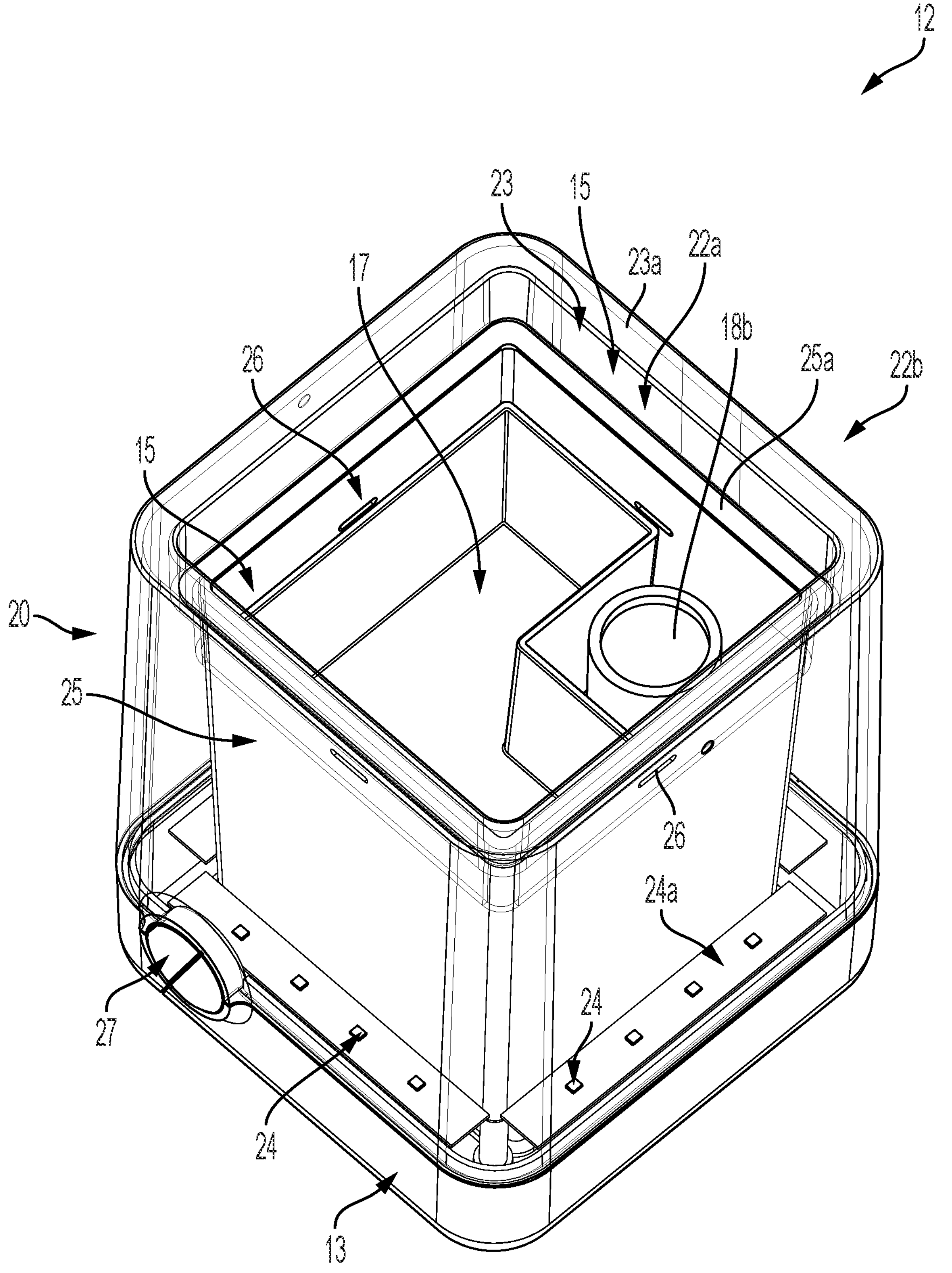
Figure 4:
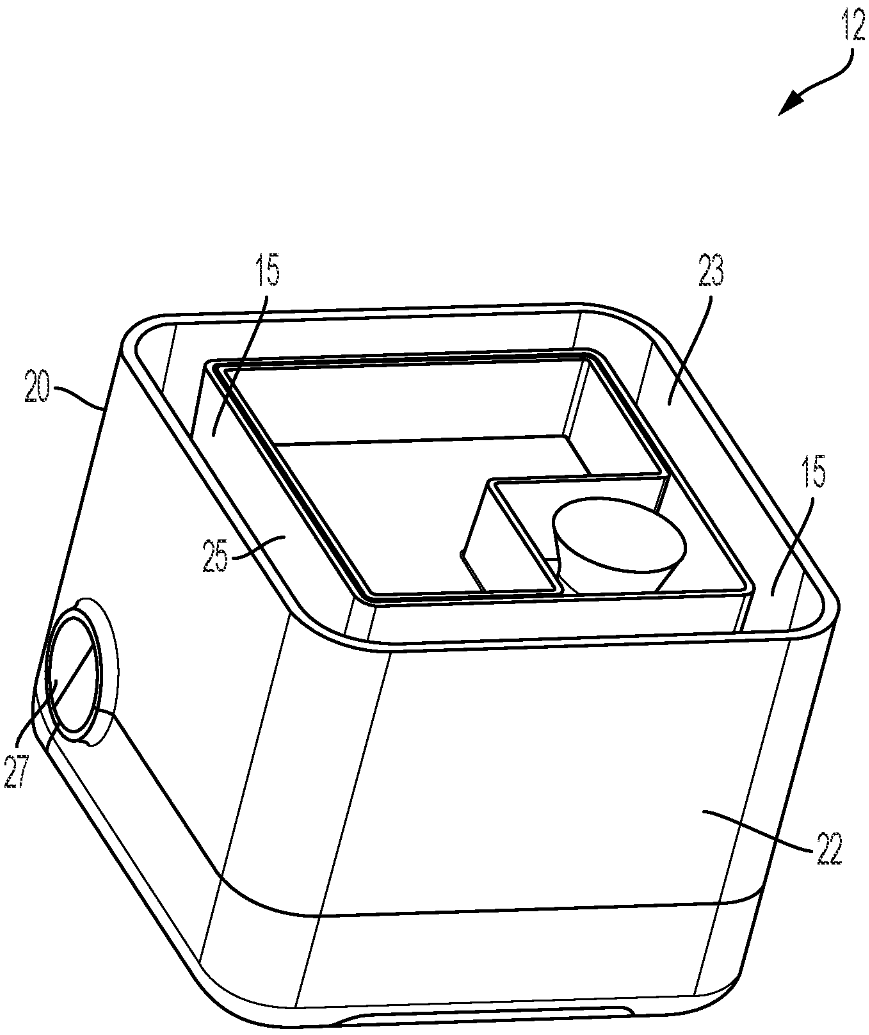
FIG. 4 shows a cutaway view of an example first light emitting component of an example lighting device according to one embodiment.

Referring now to FIGS. 2-4, the first light emitting component 12 may comprise a housing 20 defining a hollow interior 18 having an open first end 21 and one or more sidewalls 22 surrounding the open first end 21. In the depicted embodiment of FIGS. 2-4, the housing 20 has a square shape (e.g., substantially square shape). However, the housing 20 may have other shapes as mentioned previously (e.g., rectangle, circle, oval, and/or the like). The first light emitting component 12 may comprise a handle 31 pivotably coupled to the to the housing 20 via one or more attachment members 32 (e.g., bolts, rivets, hooks, clips, fasteners, and/or the like) configured to enable pivotable movement of the handle between a deployed orientation (e.g., in which handle 31 is extending at least substantially vertically) and a collapsed orientation (e.g., in which the handle is resting against the housing 20). The handle 31 may pivot freely about the attachment members 32. However, it should be understood that in certain embodiments, the handle 31 may be coupled to the housing 20, such that the handle 31 is not pivotable. As shown in FIG. 2, the handle 31 may be coupled to the housing 20 proximate to an upper portion of the housing 20. However, various embodiments may include any of a variety of other lifting mechanisms, such as straps, clips, hooks, and/or the like (in an alternative to or in addition to the handle), and various embodiments may not include a handle coupled to the housing 20.

As shown in FIG. 3, the housing 20 comprises a light-transmissive portion 15 and a base 13. In the embodiment shown, the light-transmissive portion 15 surrounds an open first end 21 of the housing, which exposes the interior storage compartment of the lighting device 10. The light-transmissive portion 15 is connected with (e.g., sealed with)

the base 13, located on an opposite, bottom end of the lighting device 10. In certain embodiments, the light-transmissive portion 15 comprises a transparent material or a translucent material configured to diffuse light emitted by included light sources. In certain embodiments, the light-transmissive portion 15 extends up to and includes at least a portion of a top surface of the housing 20. In other embodiments, the light-transmissive portion 15 encompasses only sidewall portions of the housing 20, with the top surface of the housing being opaque. It should be understood that various designs (e.g., with opaque, transparent, and/or translucent portions) may be embodied within the light-transmissive portion 15. Moreover, the light-transmissive portion 15 may comprise materials of one or more colors (e.g., white, red, orange, and/or the like), such that the light-transmissive portion 15 may operate to filter the wavelengths of light emitted by the lighting device 10.

As shown, the housing defines a sealed region between outer walls of the lighting device (the outermost surface of the lighting device) and inner walls of the lighting device (defining the interior storage compartment). The sealed region encompasses a region within the light-transmissive portion 15 and the base 13. The sealed region may be sealed via an adhesive, a gasket, one or more interference fit clips, and/or the like. The sealed region may be water-proof or water-resistant. One or more first light sources 24 may be disposed within the sealed region of the housing 20 (e.g., within the base) to emit light through a light-transmissive portion 15.

In certain embodiments, the one or more first light sources 24 may comprise one or more light emitters (e.g., light emitting diodes (LEDs)). In the noted embodiments, in which the one or more first light sources 24 comprise one or more LEDs, the one or more LEDs may be disposed within the housing 20 has an array of LEDs exterior to the opaque side 25 of the one or more sidewalls 22. Moreover, in the embodiments in which the one or more first light sources 24 comprise one or more LEDs, the one or more first light sources 24 may, collectively, be configured for emitting light according to one or more wavelengths (e.g., various colors). For example, the one or more first light sources 24 may comprise one or more first light sources configured to emit light according to a first wavelength (e.g., a first color), and one or more second light sources configured to emit light according to a second wavelength (e.g., a second color). As a specific example, the one or more first light sources 24 may comprise one or more light sources (e.g., white LED) configured to emit white light, and one or more light sources (e.g., red LED) configured to emit red light, and may be configured for simultaneous illumination and/or alternative illumination, thereby providing a plurality of alternative lighting modes. In the noted example, the lighting device 10 may be configured to activate the red LED via a first lighting mode (e.g., a red light mode) for the first light emitting component 12 or the one or more white LEDs (e.g., a plurality of white LEDs) via a second lighting mode (e.g., a white light mode) for the first light emitting component 12 in the alternative.

The first light sources 24 may be spaced around a perimeter of the lighting device 10, within the sealed region. As shown in FIG. 3, the first light sources 24 are disposed on substrates (e.g., printed circuit boards (PCBs) 24*a* that are aligned with linear sidewall portions. Each linear sidewall portion has a corresponding substrate, and thus in the illustrated embodiment, the lighting device 10 comprises four substrates. Moreover, in the illustrated embodiment, each substrate has four LEDs disposed thereon, for a total of 16 first light sources 24. It should be understood that a greater or lesser number of lighting sources may be utilized in other embodiments. Moreover, while the embodiment illustrated in FIG. 3 includes multiple substrates, it should be understood that a single substrate may be utilized in other embodiments.

As specifically shown in FIGS. 3 and 4, the sealed region may be defined within a portion of the one or more sidewalls 22 comprising a light-transmissive side 23 defining an outer sidewall of the one or more sidewalls 22, and an opposite, opaque side 25 defining an inner sidewall 22*a* of the one or more sidewalls 22. As discussed above, the light-transmissive side 23 (which may be transparent or translucent) defining an outer sidewall 22*b* of the one or more sidewalls 22 enables light generated by the one or more first light sources 24 disposed (e.g., located) within the sealed portion of the housing 20 to be emitted through the light-transmissive side 23 to be discernable by a user. In certain embodiments, the opaque side 25 may be embodied as a removable, opaque liner for the storage compartment of the lighting device 10. In other embodiments, the opaque side 25 may be affixed (e.g., permanently affixed) relative to the light-transmissive portion 15. As shown in FIG. 3, the one or more first light sources 24 may be disposed within the light-transmissive portion 15 along a perimeter of the opaque side 25 defining an inner sidewall of the one or more sidewalls 22 and proximate to a lower end of the light-transmissive portion 15.

The inner sidewall 22*a* of the one or more sidewalls 22 may be embodied as the opaque liner for the storage compartment. When the liner is placed within the storage compartment (removably or permanently) the one or more inner sidewalls 22*a* have an edge 25*a* surrounding the inner sidewall 22*a* that is lower than an edge 23*a* surrounding the outer sidewalls 22*b*, and as further described herein, the edge of the inner sidewall 22*a* may be configured to support the second light emitting component 14 (e.g., embodying a lid of the device) when the second light emitting component 14 is nested within the open end of the first light emitting component 12. Moreover, as shown in FIG. 3, the opaque inner sidewalls 22*a* may define at least one light-passthrough 26 extending at least through the opaque side 25 defining the inner sidewall 22*a*. As further described herein, the at least one light-passthrough 26 may be configured to enable light from the second light emitting component 14 to be visible through at least a portion of the one or more sidewalls 22 when the second light emitting component 14 is nested within the open end of the first light emitting component 12. Thus, if a user accidentally left the second light emitting component 14 activated after nesting the second light emitting component 14 into the open end of the first light emitting component 12, the user can see that the light is still active, and can then deactivate the second light emitting component 14. As a specific example, the at least one light-passthrough 26 may comprise one or more openings 26 defined by the inner sidewall 22*a*. In other embodiments, the one or more light-passthrough 26 may comprise a light-transmissive portion (e.g., translucent or transparent) defined within the opaque inner sidewall 22*a*, while maintaining a smooth and/or fluid-impermeable surface of the inner sidewall 22*a*. Thus, the sealed region remains sealed to prevent/impede water intrusion into the area housing the LEDs.

Figure 5:
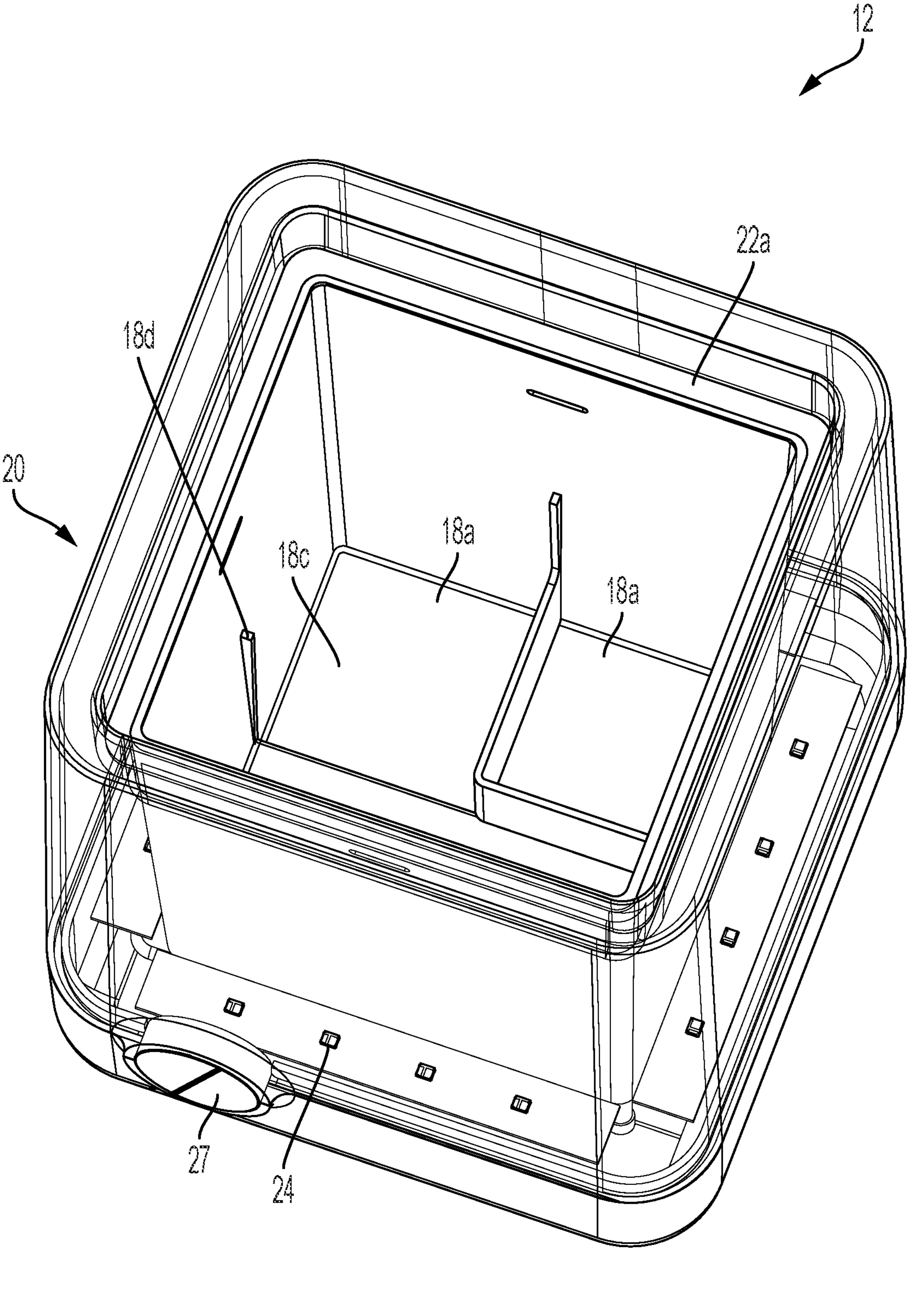
FIG. 5 shows an interior of an example first light emitting component according to one embodiment.

FIG. 5 illustrates the hollow interior 18 defined by the housing 20 (e.g., defined by the inner sidewall 22*a* of the one or more sidewalls 22 of the housing 20). As shown, the hollow interior 18 defines one or more storage spaces 18*a*

(e.g., storage compartments) configured for storing various items, such as emergency kit items 18*b* (e.g., flashlights, batteries, headlamps, and/or the like) and/or other items. Moreover, the lighting device 10 may include a storage unit (e.g., tray) removably disposed within the hollow interior 18, as shown in FIGS. 6A and 6B (6B showing a tray 17 removed from the interior of the lighting device 10). The hollow interior 18 may comprise one or more support members 18*d* (e.g., one or more thin standoffs having substantially flat top surfaces that collectively (across all standoffs) support the tray 17 above the inner bottom end 18*c* of the interior surface) extending upwardly from an inner bottom end 18*c* (surrounded by the inner sidewall 22*a* of the housing 20 and protruding outwardly incrementally from the inner bottom end 18*c*.

As shown in FIGS. 1-5, the lighting device 10 comprises a user interface (embodied as a power switch/button 27 in the illustrated embodiment) configured to accept user input to select from a plurality of usage states for the first light emitting component 12 of the lighting device 10. The user interface may comprise one or more buttons, one or more sliders, one or more switches, one or more interface wheels, one or more capacitive sensors, and/or the like. In various embodiments, the user interface enables a user to select between an "on" state (e.g., a single "on" state at a non-selectable power level) and an "off" state. The user interface may, in certain embodiments, enable toggling between a plurality of "on" states corresponding to various output modes (e.g., a red light mode or a white light mode) and/or various output power levels (e.g., various brightness levels emitted by the one or more first light sources 24 of the illustrated lighting device 10). As a specific example, the various output power levels may comprise a high brightness level, a low brightness level, a dimming brightness level, and a night light brightness level emitted by the one or more first light sources 24.

In certain example embodiments, a single button user interface may allow users to cycle between an "off" state and various "on" states with sequential activations of the button. For example, pressing the button once turns the light on to a first lighting mode (e.g., a red light mode), pressing the button again changes the light to a second lighting mode (e.g., a white light mode) at a first brightness level, and pressing the button a third time changes the light to a second brightness level within the second lighting mode, and pressing the button yet again cycles the light back to the off state. Certain other example embodiments may comprise only a single lighting mode, and therefore pressing the user-interface button multiple times may cycle the light through various brightness levels within a single lighting mode (e.g., within a white light mode). In certain other embodiments, the user interface may comprise a first power switch (e.g., to turn the first light emitting component 12 of the lighting device 10 on and/or off) and a second power switch (e.g., to select between a plurality of illumination states).

As shown in FIG. 6A, the first light emitting component 12 of the lighting device 10 comprises at least one charging channel configured for providing power (e.g., electrical current) from the lighting device 10 to a separate electrical device 50 (shown schematically in FIG. 7) connected via the charging channel. In the illustrated embodiment of FIG. 6*a*, the charging channel is embodied as a charging channel port 28 (e.g., a USB-port, a micro-USB port, a mini-USB port, a USB-C port, a lightning charger port, and/or the like) configured to accept an electrical device 50 (e.g., a charging/data cable, an electrical device comprising an onboard, rechargeable power source, and/or the like) and is carried by the housing 20. However, the charging channel may also be embodied as any of a variety of power-communicating interfaces, such as a wireless inductive charging interface, a magnetic power port, a two-prong power outlet, and/or the like. In certain embodiments, an onboard controller 30 may be configured to automatically dim the output light of the device when an external device is connected to be charged, as described in U.S. Pat. No. 10,433,396, which is incorporated herein by reference in its entirety.

Figure 7:
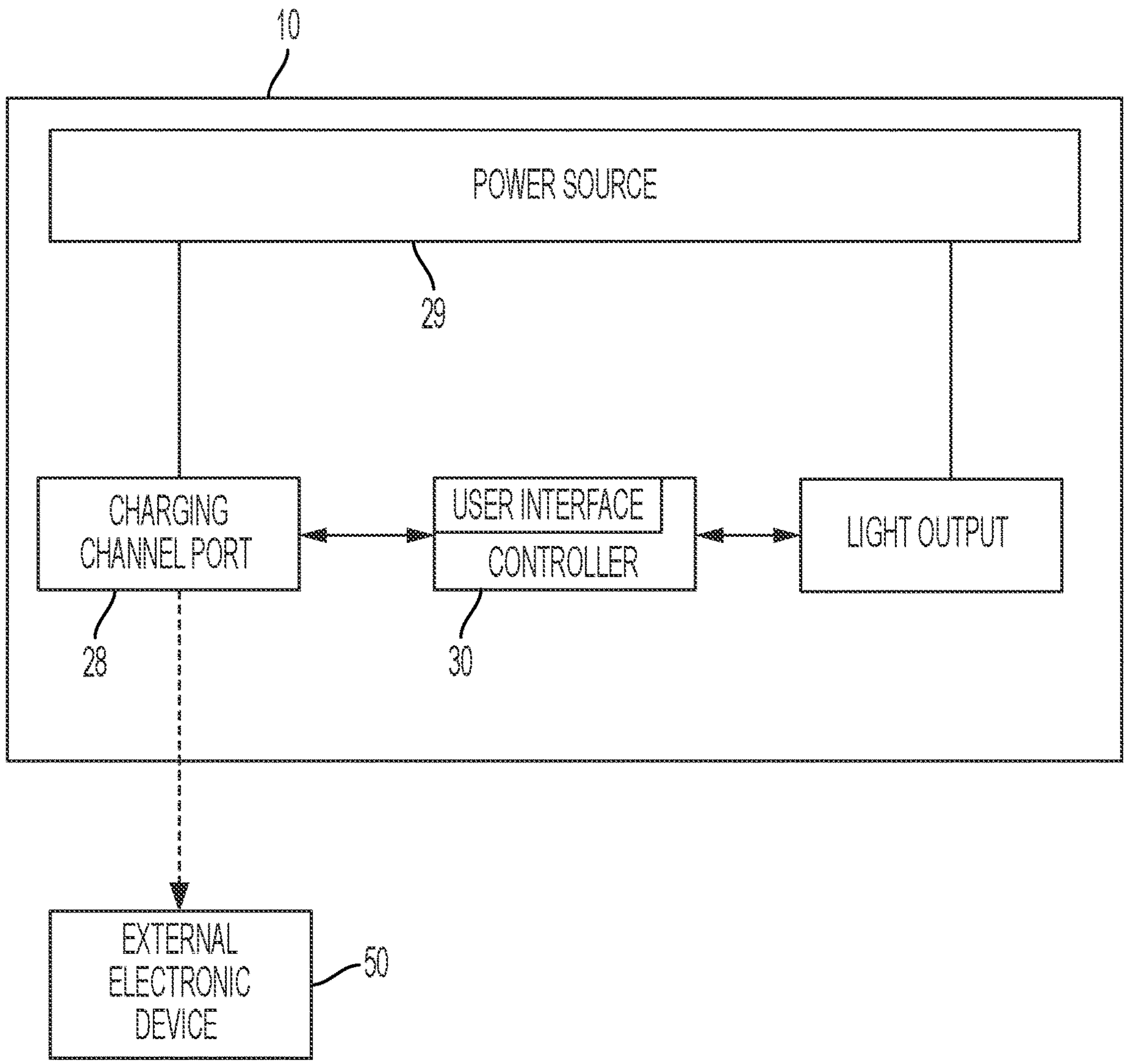
FIG. 7 shows a schematic diagram of various electrical components of an example lighting device according to one embodiment.
Figure 8:
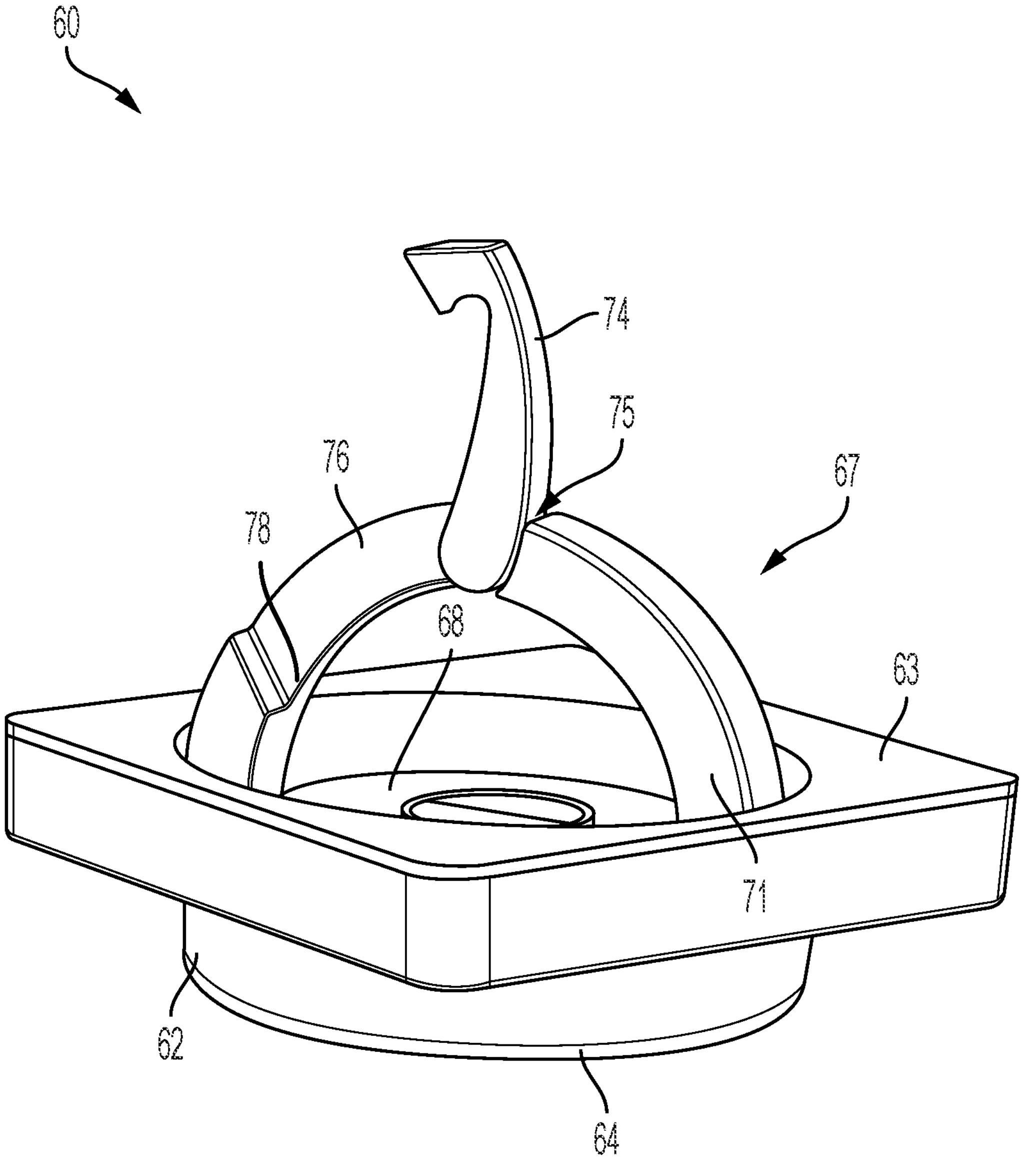
FIGS. 8-11 shows an example second light emitting component of an example lighting device according to one embodiment.
Figure 9:
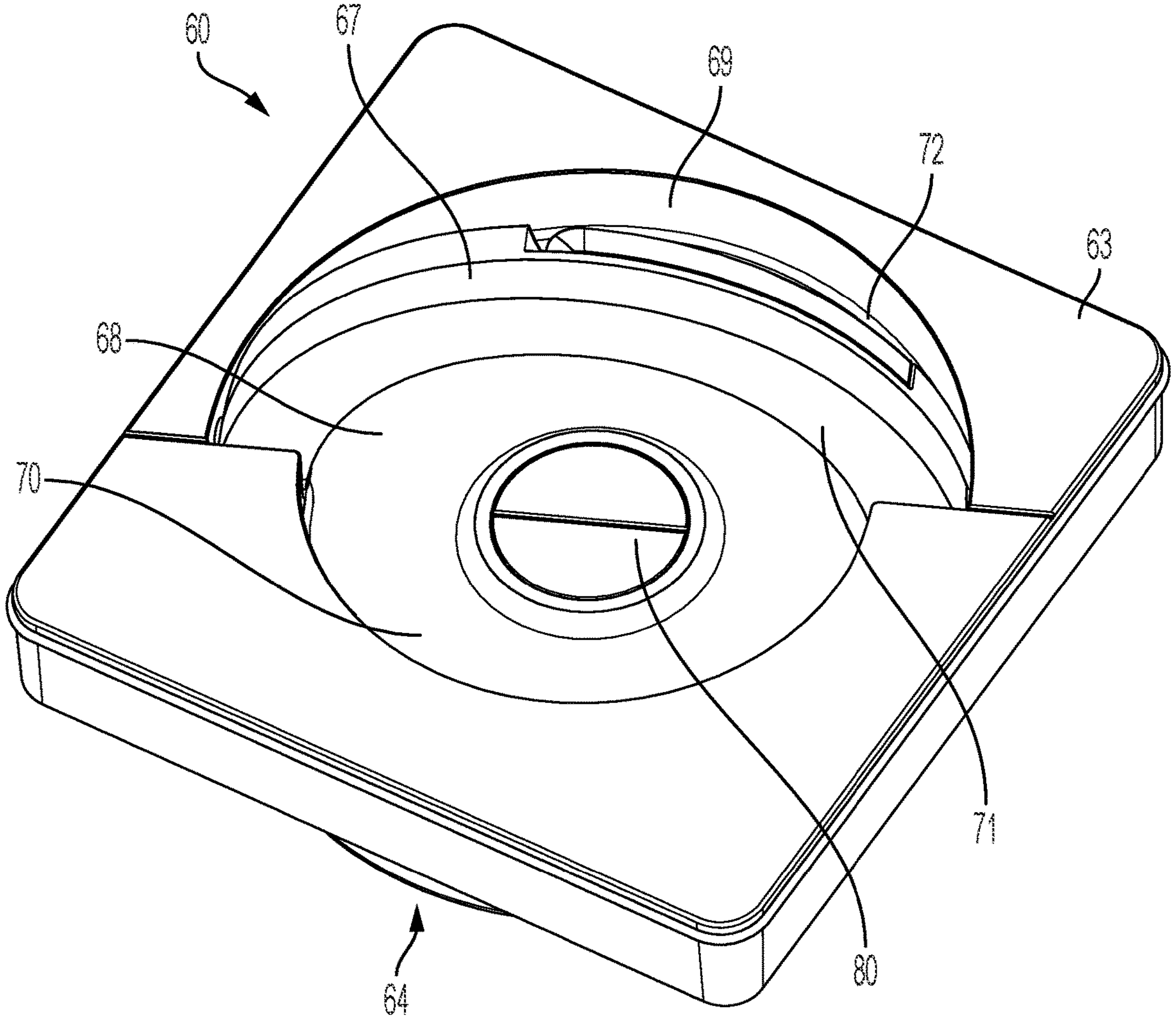

As shown schematically in FIG. 7, the lighting device 10 comprises a power source 29 (first power source), which may be embodied as an onboard power source comprising one or more batteries (e.g., replaceable primary batteries or rechargeable secondary batteries (integrated within the lighting device 10 or replaceable secondary batteries)) or other electricity storage devices. For example, in certain embodiments, the lighting device 10 may comprise an onboard power source usable with the light sources to generate a light output of at least about 1000 lumens. As a specific example, the lighting device may comprise an onboard power source embodied as a 4800 mAh rechargeable battery and 3 AA primary batteries that may be inserted into a corresponding slot to house the primary batteries. As another specific example, the lighting device may comprise an onboard power source embodied as 4 replaceable D-cell batteries. It should be understood that embodiments may be configured to house other numbers or sizes of batteries. As yet another example, the power source 29 may comprise one or more power converters (e.g., connectable to external, continuous power supplies), and/or the like. The power converters may be utilized to power the light source and/or to recharge onboard power sources. The power source 29 is disposed within the base 13 of the housing 20.

The power source 29 provides power to an output device configured for generating an output (e.g., first light emitting component 12 configured for generating a light output) and the at least one charging channel (e.g., charging channel port 28) via a controller 30. In certain embodiments, the controller 30 is embodied as an integrated circuit configured for directing a flow of electrical power (e.g., electrical current) from the power source 29 to the output device and/or the at least one charging channel. The controller 30 is in communication with the user interface 27 to direct power from the power source 29 to the lighting device output.

The controller 30 may also form a feedback loop with the charging channel to detect when a separate electrical device 50 is connected for charging from the lighting device 10. In embodiments in which the charging channel is embodied as a charging channel port 28, the charging channel port 28 may comprise a presence sensor for detecting when the lighting device 10 is connected to the charging channel port 28. For example, the charging channel port 28 may comprise a presence-sensing pin that transmits a signal upon detecting a connected separate electrical device 50 to the onboard controller 30 to indicate the presence of the separate electrical device 50 in electrical connection with the charging channel port 28. One particular embodiment of a charging channel port 28 is a 5 pin USB connector. As yet other examples, the charging channel may comprise mechanical switches for detecting the presence of a separate electrical device 50 (e.g., cables connected via the charging channel), magnetic switches, current-sensors for detecting an electrical current drawn across the charging channel to a connected separate electrical device 50, and/or the like.

The onboard controller 30 may be configured to control the electrical power expended by the lighting device 10 for generating outputs via the output device (e.g., one or more first light sources 24) and for charging separate electrical devices 50 via the charging channel. In certain embodiments, the onboard controller 30 may be configured to throttle electrical power (e.g., by decreasing a permitted maximum constant current to be provided to the output device, by decreasing the width of power-pulses provided to the output device via pulse-width modulation, and/or the like) supplied to the output device (e.g., first light emitting component 12), thereby decreasing the output power level emitted by the output device when a separate electrical device 50 is detected to be connected via the charging channel. For example, the onboard controller 30 may be configured to implement a maximum constant current level to be provided to the output device that is lower than a maximum constant current level implemented while no separate electrical device 50 is connected relative to the charging channel, thereby decreasing the output power level generated by the output device (e.g., dimming the output light emitted by the lighting device 10). As yet another example, the onboard controller 30 may be configured to provide pulse-width modulated current pulses to the output device at shorter power intervals as compared to the length of power intervals provided when no separate electrical device 50 is connected via the charging channel, which thereby decreases the output power level generated by the output device. For example, using pulse-width modulation, the light emitted by the output device may be less bright when a separate electrical device 50 is connected via the charging channel as compared to the brightness when a separate electrical device 50 is not connected via the charging channel. Specifically, when a separate electrical device 50 is detected to be connected via the charging channel, the onboard controller 30 decreases the power provided to the output device if the output device is active at the time the electrical connection is formed with the separate electrical device 50 via the charging channel, and/or the onboard controller 30 decreases a maximum output power level available for the onboard output device (e.g., lighting device 10).

Second Light Emitting Component 14

Figure 10:
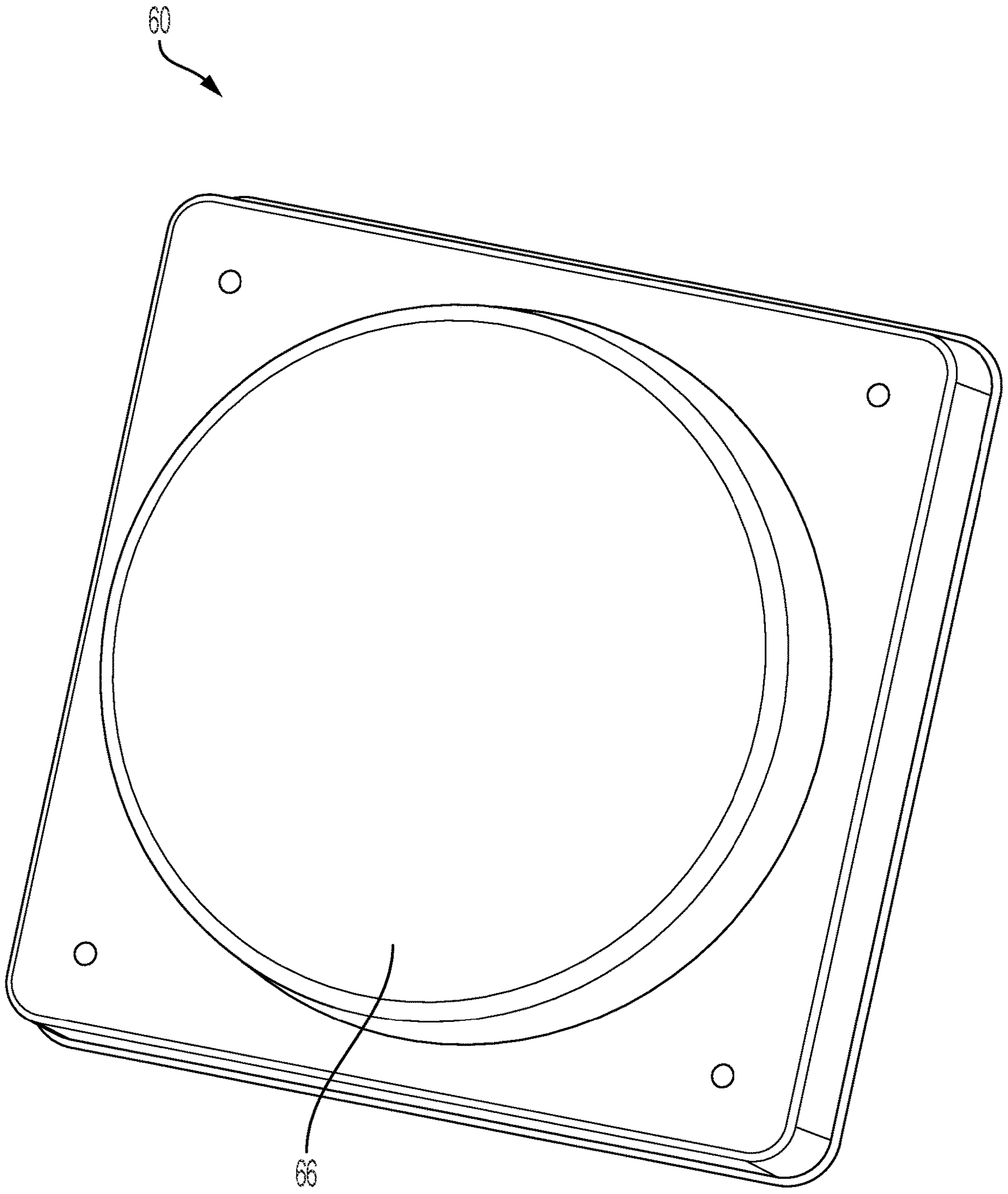
Figure 11:
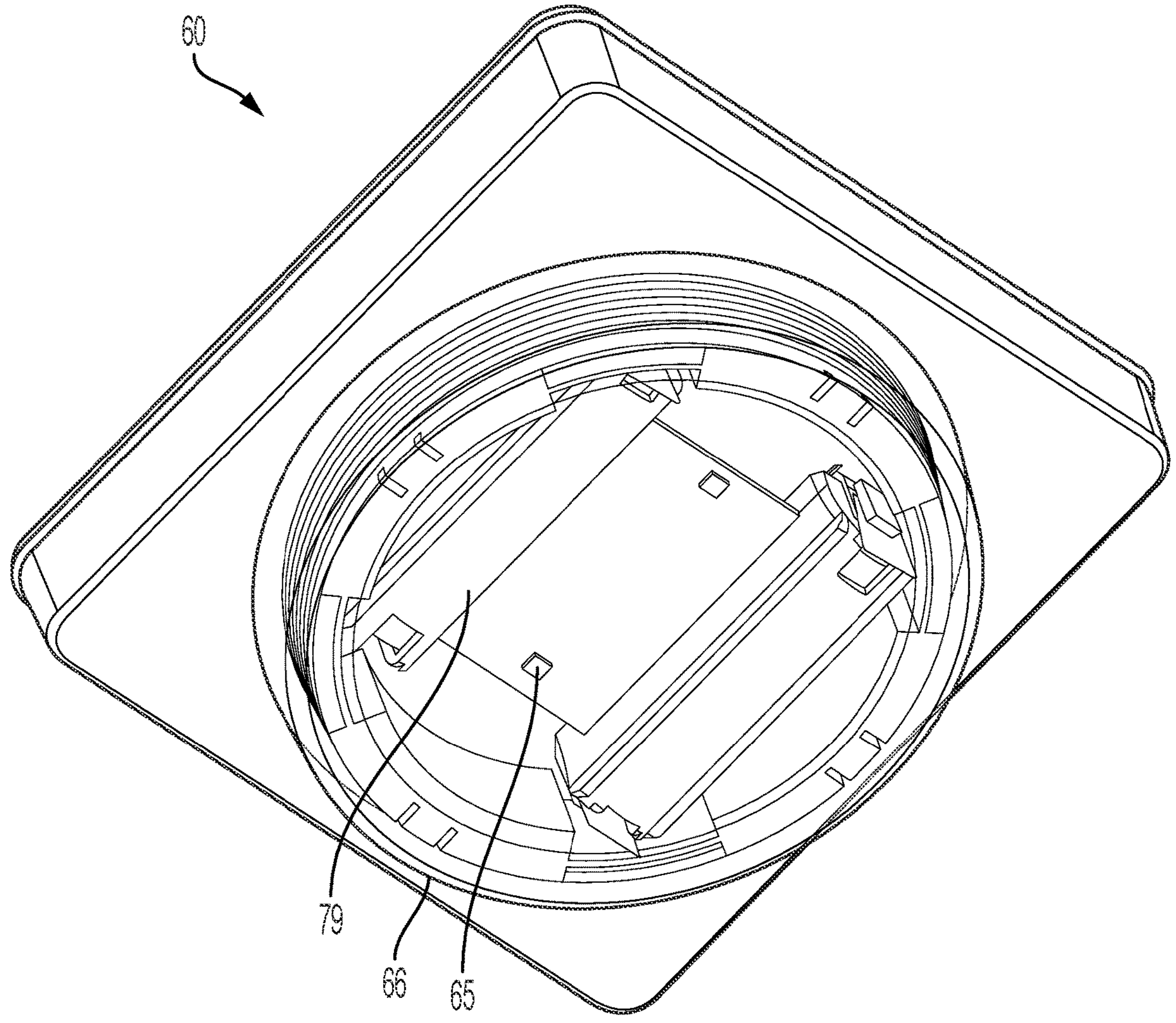

Referring now to FIGS. 8-11, the second light emitting component 14 may comprise a body 60 defining a first end 62 and a second end 63. At least a portion of the first end 62 defines a light emitting portion 64 and one or more second light sources 65 (e.g., light bulbs, light filaments, light panels, and/or the like) may be disposed (e.g., located) within the body 60 to emit light through the light emitting portion 64. As shown in FIGS. 10-11, the light emitting portion 64 may be defined by a lens portion 66 of the body 60. The lens portion 66 may cover the one or more second light sources 65 and may be transparent (as shown in FIG. 11) or translucent (as shown in FIG. 10) to enable light generated by the one or more second light sources 65 to be emitted through the lens portion 66 to be discernable by a user. As a specific example, the one or more second light source 65 may comprise one or more light emitters (e.g., light emitting diodes (LEDs)).

In certain embodiments in which the one or more second light sources 65 comprise one or more LEDs, the one or more second light sources 65 may, collectively, be configured for emitting light according to one or more wavelengths (e.g., various colors). For example, the one or more light sources 65 may comprise one or more second light sources configured to emit light according to a first wavelength (e.g., a first color), and one or more second light sources configured to emit light according to a second wavelength (e.g., a second color). As a specific example, the one or more second light sources 65 may comprise one or more second light sources (e.g., white LED) configured to emit white light, and one or more second light sources (e.g., red LED) configured to emit red light, and may be configured for simultaneous illumination and/or alternative illumination, thereby providing a plurality of alternative lighting modes. In the noted example, the lighting device 10 may be configured to activate the red LED via a first lighting mode (e.g., a red light mode) or the one or more white LEDs (e.g., a plurality of white LEDs) via a second lighting mode (e.g., a white light mode) in the alternative.

The second light emitting component 14 may comprise a handle 67 having a first side 71 and second side 72. In certain embodiments, such as the illustrated embodiment of FIGS. 8-10, the handle 67 may be pivotally coupled to a recessed portion 68 of the body 60 via one or more attachment members that enables movement of the handle 67 between a deployed orientation (e.g., standing orientation) and a collapsed orientation (e.g., folded orientation). The recessed portion 68 may have a depth that is at least the same (or greater) than a thickness of the handle 67, and may comprise a first curved portion 69 and a second curved portion 70 having a diameter that is greater than a diameter of the first curved surface to enable the handle 67 to be supported by the first curved portion 69 when in the deployed orientation and disposed within the second curved portion 70 when in the collapsed orientation.

In certain embodiments, the handle 67 and the recessed portion 68 may be sized and/or dimensioned such that when the handle 67 is in a collapsed orientation, the first side 71 of the handle 67 is parallel with an edge surrounding the recessed portion 68 of the body 60. It should be understood, that in various embodiments, the handle 67 may have a different shape and the recessed portion 68 may not comprise a first curved portion 69 and a second curved portion 70. For example, in one embodiment, the handle 67 may have a square shape and the recessed portion 68 may comprise a first square-shaped portion and a second square-shaped portion having different lengths. Further, it should be understood that various embodiments may not include a handle 67, and may instead include any of a variety of other support mechanism or lifting mechanisms, such as straps, clips, loops, hook-and-loop fasteners, and/or the like.

The handle 67 may include a hook member 74 configured for being coupled to a support structure (e.g., to suspend the second light emitting component from a support structure). The hook member 74 may be pivotally secured to a first end 75 of a recessed portion 76 of the handle 67 via one or more attachment members that enables movement (e.g., swivel fashion) of the hook member 74 between a deployed orientation and a collapsed orientation. The recessed portion 76 may include a lip 78 configured for supporting the hook member 74 when in a collapsed orientation.

The second light emitting component 14 comprises a user interface (embodied as a power switch 80 in the illustrated embodiment). In the illustrated embodiment, the user interface is disposed within the recessed portion 68 of the body 60. The user interface may comprise one or more buttons, one or more sliders, one or more switches, one or more interface wheels, one or more capacitive sensors, and/or the like. In various embodiments, the user interface enables a user to select between an "on" state (e.g., a single "on" state at a non-selectable power level) and an "off" state. The user interface may, in certain embodiments, enable selection between a plurality of "on" states corresponding to various output modes (e.g., a red light mode or a white light mode) and/or various output power levels (e.g., various brightness levels emitted by the one or more light sources 65 of the second light emitting component 14 of the example lighting device 10). A single button user interface may allow users to cycle between an "off" state and various "on" states with sequential activations of the button. For example, pressing the button once turns the light on to a first lighting mode (e.g., a red light mode), pressing the button again changes the light to a second lighting mode (e.g., a white light mode) at a first brightness level, and pressing the button a third time changes the light to a second brightness level within the second lighting mode, and pressing the button yet again cycles the light back to the off state. Other example embodiments comprise only a single lighting mode, and therefore pressing the user-interface button multiple times may cycle the light through various brightness levels within a single lighting mode (e.g., within a white light mode).

The body 60 may be configured (e.g., sized, dimensioned, or the like) to nest within the open first end 21 of the housing 20 of the first light emitting component 12 such that when the body is inserted into the housing 20 of the first light emitting component 12, the second end of the body 60 is parallel with an edge surrounding the open first end 21 of the housing 20. In certain embodiments, the body 60 nests within the open first end 21 of the housing 20 with a gasket or other component that seals the body 60 into the open first end 21 against water intrusion. Moreover, the body 60 nests within the open first end 21 to define a frictional engagement therebetween, such that the second light emitting component 14 remains coupled with the first light emitting component 12 unless a user physically decouples the components of the lighting device 10. In certain embodiments, the body 60 may have a shape that is the same as the shape of the housing 20 of the first light emitting component 12 to enable the second end of the body 60 to be parallel with an edge surrounding the open first end 21 of the housing 20. For example, in the illustrated example embodiments, the body 60 and the housing 20 may both have a square shape. However, it should be understood that in various other embodiments, the body 60 and housing 20 may have a variety of shapes (circle, oval, rectangular, polygonal, and/or the like), and the shape of the body 60 and the housing 20 may be different.

In certain embodiments, the second light emitting component 14 comprises a second power source (e.g., batteries 79), which may be embodied as an onboard power source comprising one or more batteries (e.g., replaceable primary batteries or rechargeable secondary batteries (integrated within the second light emitting component or replaceable secondary batteries)) or other electricity storage devices. For example, in certain embodiments, the second light emitting component 14 may comprise an onboard power source capable of, with the light sources, generating a light output of at least about 100 lumens. As a specific example, the lighting device may comprise an onboard power source embodied as 2AA batteries. The power source (not shown) provides power to the one or more second light sources 65 configured for generating a light output. In certain embodiments, the body 60 comprises one or more electrical contacts (not shown) that is in electrical communication with one or more electrical contacts (not shown) of the housing 20 of the first light emitting component 12 to enable the power source of the body to be charged from the housing 20.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A lighting device comprising:

a first light emitting component comprising:

a housing having an open first end and one or more sidewalls surrounding the open first end, wherein at least a portion of the one or more sidewalls defines a light-transmissive portion;

one or more first light sources disposed within the housing to emit light through the light-transmissive portion;

a second light emitting component comprising:

a body defining a first end and a second end, wherein the body is configured to fit within the open first end of the housing to position the first end of the body within the housing and wherein at least a portion of the first end of the body defines a light emitting portion positioned within the housing when the body is inserted within the open first end; and one or more second light sources disposed within the body to emit light through the light emitting portion.

2. The lighting device of claim 1, wherein the housing and the body have the same shape.

3. The lighting device of claim 1, wherein when the body is inserted into the housing, the second end of the body is parallel with an edge surrounding the open first end of the housing.

4. The lighting device of claim 1, wherein the light-transmissive portion is defined within a portion of the one or more sidewalls as including: (i) a light-transmissive side defining an outer sidewall of the one or more sidewalls and (ii) an opposite, opaque side defining an inner sidewall of the one or more sidewalls.

5. The lighting device of claim 4, wherein the one or more sidewalls defines at least one light-passthrough, extending at least through the opaque side to enable light from the one or more second light sources to be visible through at least a portion of the one or more sidewalls.

6. The lighting device of claim 1, wherein the housing has a hollow interior.

7. The lighting device of claim 6, wherein the hollow interior defines a storage space.

8. The lighting device of claim 7, wherein the lighting device further comprises a tray that fits within the storage space.

9. The lighting device of claim 1, wherein the housing further comprises a first power source.

10. The lighting device of claim 9, wherein the housing further comprises a charging channel configured for transmitting electrical current from the first power source to a separate electrical device.

11. The lighting device of claim 9, wherein the first power source comprises one or more onboard batteries.

12. The lighting device of claim 1, wherein the body further comprises a second power source.

13. The lighting device of claim 12, wherein each of the body and the housing further comprise electrical contacts such that the second power source can be charged from the housing.

14. The lighting device of claim 1, wherein the one or more first light sources comprises one or more light emitting diodes.

15. The lighting device of claim 1, wherein the one or more second light sources comprises one or more light emitting diodes.

16. The lighting device of claim 1, wherein the lighting device defines a cube shape.

17. The lighting device of claim 1, wherein the body further comprises a handle and a hook member coupled to the handle configured for being coupled to a support structure.

18. The lighting device of claim 17, wherein the handle comprises a recessed portion, wherein the recessed portion is configured for receiving the hook member when in a collapsed orientation.

* * * * *